(12) United States Patent  
Ohno et al.

(10) Patent No.: US 7,993,740 B2
(45) Date of Patent: Aug. 9, 2011

(54) HONEYCOMB STRUCTURE (75) Inventors: Kazushige Ohno, Ibi-gun (JP); Masatoshi Okuda, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 423 days.

(21) Appl. No.: 12/248,546

(22) Filed: Oct. 9, 2008

(65) Prior Publication Data

US 2009/0191378 A1   Jul. 30, 2009

(30) Foreign Application Priority Data

Jan. 28, 2008   (JP) .................... PCT/JP2008/051188

(51) Int. Cl.
B32B 3/12      (2006.01)
B32B 3/26      (2006.01)
B01D 39/06     (2006.01)

(52) U.S. Cl. ............... 428/317.5; 428/307.3; 428/312.2; 428/315.5; 428/314.2; 428/317.9; 428/317.7; 428/116; 428/117; 55/523; 55/524

(58) Field of Classification Search .......... None
See application file for complete search history.

(56) References Cited

U.S. PATENT DOCUMENTS

| | | | |
|---|---|---|---|
| 5,914,187 A | 6/1999 | Naruse et al. | |
| 2005/0109023 A1 | 5/2005 | Kudo et al. | |
| 2006/0101747 A1 | 5/2006 | Masukawa et al. | |
| 2008/0202086 A1 | 8/2008 | Ohno et al. | |
| 2008/0202087 A1 | 8/2008 | Ohno et al. | |
| 2008/0203626 A1 | 8/2008 | Ohno et al. | |
| 2008/0236394 A1 | 10/2008 | Ohno et al. | |
| 2008/0237941 A1 | 10/2008 | Ohno et al. | |
| 2008/0241501 A1 | 10/2008 | Ohno et al. | |
| 2008/0286523 A1 | 11/2008 | Ohno et al. | |

FOREIGN PATENT DOCUMENTS

| | | |
|---|---|---|
| EP | 1806329 | 7/2007 |
| EP | 1982966 | 10/2008 |
| WO | WO 97/25203 | 7/1997 |
| WO | WO 03/067041 | 8/2003 |
| WO | WO 2005/047209 | 5/2005 |
| WO | WO 2007/111279 | 10/2007 |

Primary Examiner — Ling Xu
(74) Attorney, Agent, or Firm — Ditthavong Mori & Steiner, P.C.

(57) ABSTRACT

A honeycomb structure includes a plurality of honeycomb fired bodies and an adhesive layer. The plurality of honeycomb fired body has a longitudinal direction and a plurality of cell walls extending along the longitudinal direction to define a plurality of cells. The adhesive layer is provided between the plurality of honeycomb fired bodies to connect the honeycomb fired bodies. Pore diameters of pores in the adhesive layer are about 300 μm or less. A ratio of a total area of pores having a pore diameter of at least about 50 μm and at most about 300 μm and an aspect ratio of at least about 1 and at most about 1.5 in a cross-section perpendicular to the longitudinal direction to a total area of pores having a pore diameter of at least about 50 μm and at most about 300 μm is about 90% or more.

9 Claims, 6 Drawing Sheets

A-A line cross-sectional view

HONEYCOMB STRUCTURE

CROSS-REFERENCE TO RELATED APPLICATIONS

The present application claims priority under 35 U.S.C. §119 to PCT Application No. PCT/JP2008/051188, filed on Jan. 28, 2008, the contents of which are incorporated herein by reference in their entirety.

BACKGROUND OF THE INVENTION

1. Field of the Invention

The present invention relates to a honeycomb structure.

2. Discussion of the Background

In recent years, particulate matter (hereinafter, also referred to as PM) such as soot contained in exhaust gases discharged from internal combustion engines of vehicles such as buses and trucks, construction machines and the like, and other harmful contaminants have raised serious problems to the environment and the human body.

For this reason, various porous ceramic honeycomb structured bodies have been proposed as filters that capture PM in exhaust gases and purify the exhaust gases and also as catalyst supporting carriers that convert contaminants in exhaust gases by allowing the exhaust gases to pass through the inside of the catalyst supporting carriers.

With respect to such a honeycomb structure, there has been known an aggregated honeycomb structure formed by combining a plurality of pillar-shaped honeycomb fired bodies each having a large number of cells longitudinally placed in parallel with one another. In such an aggregated honeycomb structure, an adhesive layer is formed on each of side faces of the honeycomb fired bodies, and the respective honeycomb fired bodies are bonded to one another with the adhesive layer interposed therebetween.

Upon use of a honeycomb structure for purifying or converting exhaust gases, the honeycomb structure allows high-temperature exhaust gases to flow through cells of the honeycomb structure. Consequently, a thermal shock is applied to the honeycomb structure during use, and when the thermal shock is increased, the honeycomb structure tends to be damaged.

However, by combining honeycomb fired bodies with one another with an adhesive layer interposed therebetween to form an aggregated honeycomb structure, the thermal shock applied to the honeycomb structure is alleviated by the adhesive layer so that it is possible to prevent the damage in the honeycomb structure.

WO 97/25203 A1 has described a honeycomb structure including a plurality of honeycomb fired bodies combined by using an adhesive containing inorganic particles, inorganic fibers, an inorganic binder and an organic binder, as an aggregated honeycomb structure.

Moreover, WO 03/067041 A1 has described a honeycomb structure in which pores are formed in an adhesive layer by adding a pore-forming agent to the adhesive layer to adjust the porosity of the adhesive layer.

The contents of WO 97/25203 A1 and WO 03/067041 A1 are incorporated herein by reference in their entirety.

SUMMARY OF THE INVENTION

According to one aspect of the present invention, a honeycomb structure includes a plurality of honeycomb fired bodies and an adhesive layer. The plurality of honeycomb fired body has a longitudinal direction and a plurality of cell walls extending along the longitudinal direction to define a plurality of cells. The adhesive layer is provided between the plurality of honeycomb fired bodies to connect the honeycomb fired bodies. Pore diameters of pores in the adhesive layer are about 300 μm or less. A ratio of a total area of pores having a pore diameter of at least about 50 μm and at most about 300 μm and an aspect ratio of at least about 1 and at most about 1.5 in a cross-section perpendicular to the longitudinal direction to a total area of pores having a pore diameter of at least about 50 μm and at most about 300 μm is about 90% or more.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Here, it is found that the adhesive layer of the honeycomb structure described in WO 97/25203 A1 includes few pores having a pore diameter of 50 μm or more. However, large voids, such as so-called "cavities", are proved to be sometimes present in the adhesive layer. Since such an adhesive layer presumably has a high Young's modulus as a whole, the function for alleviating the thermal shock applied to the honeycomb structure is not sufficiently exerted. As a result, damage problematically occurs in the honeycomb structure.

Moreover, cracks originating from the large voids in the adhesive layer possibly occur in the adhesive layer.

On the other hand, since the adhesive layer of the honeycomb structure described in WO 03/067041 A1 is found to be formed by using an adhesive paste containing a pore-forming agent, comparatively large pores of 50 μm or more are formed in the adhesive layer.

However, observation of the shapes of the pores in the adhesive layer reveals that there are variations in shapes of the pores and the pores formed by the pore-forming agent are coupled to one another into pores having a large aspect ratio in some portions. For this reason, when a thermal shock is applied to the honeycomb structure, pores having a large aspect ratio problematically tend to develop into damage originating therefrom, resulting in cracks in the adhesive layer.

First Embodiment

With reference to the figures, a honeycomb structure according to a first embodiment of the present invention will be discussed.

Figure 1:
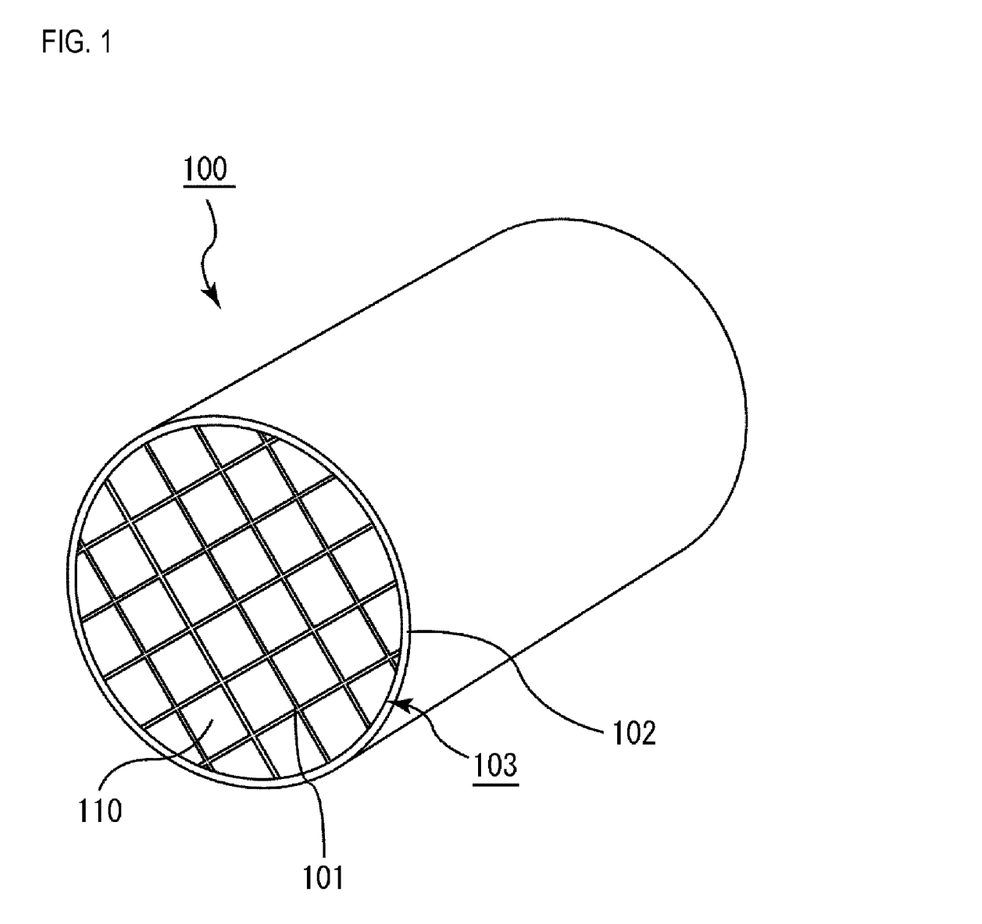
FIG. 1 is a perspective view that schematically shows one example of the honeycomb structure according to one embodiment of the present invention.
Figure 2A:
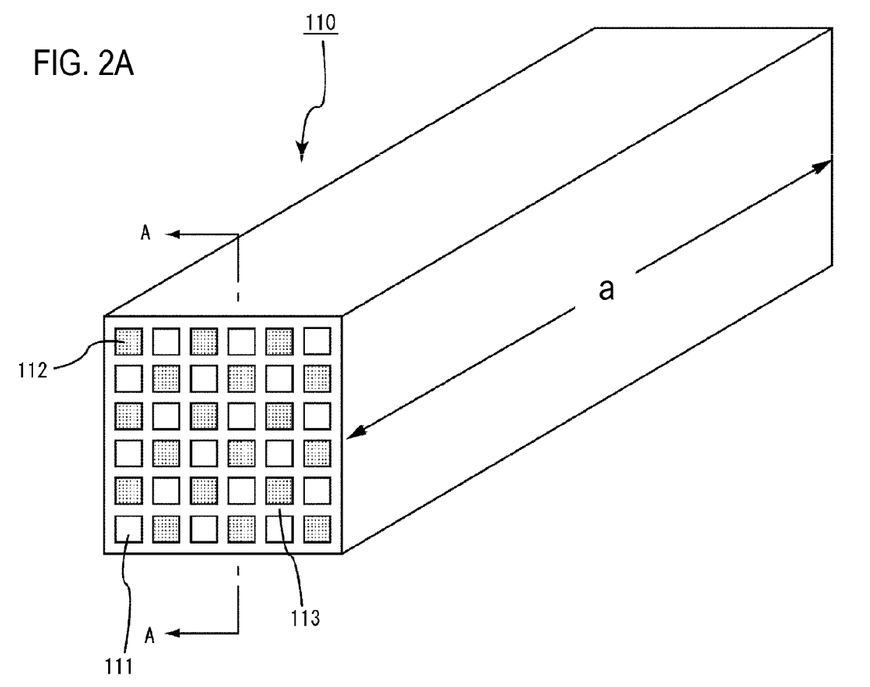
FIG. 2A is a perspective view that schematically shows one example of a honeycomb fired body forming the honeycomb structure according to one embodiment of the present invention.

FIG. 1 is a perspective view that schematically shows one example of a honeycomb structure according to one embodiment of the present invention. FIG. 2A is a perspective view that schematically shows one example of a honeycomb fired body forming the honeycomb structure according to one embodiment of the present invention, and FIG. 2B is an A-A line cross-sectional view of FIG. 2A.

Figure 2B:
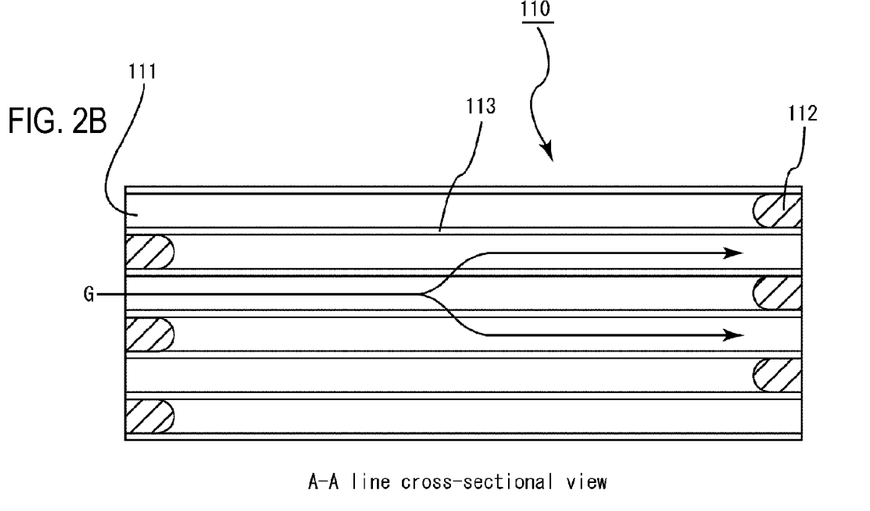
FIG. 2B is an A-A line cross-sectional view of FIG. 2A.

As shown in FIG. 1, a honeycomb structure 100 according to the embodiment of the present invention has a structure in which a plurality of porous silicon carbide honeycomb fired bodies 110 having a shape shown in FIGS. 2A and 2B are combined with one another with an adhesive layer 101 interposed therebetween to form a ceramic block 103, with a coat layer 102 formed on the periphery of the ceramic block 103.

The honeycomb fired body 110 shown in FIGS. 2A and 2B has a structure in which a large number of cells 111 are longitudinally placed (the direction a in FIG. 2A) in parallel with one another with a cell wall 113 therebetween, and either one end of each of the cells 111 is sealed with a plug 112. Therefore, exhaust gases G having flowed into one of the cells 111 with an opening end on one end face surely passes through the cell wall 113 that separates the cells 111, and flows out from another cell 111 with an opening end on the other end face.

Therefore, the cell wall 113 functions as a filter for capturing PM and the like.

In the honeycomb structure 100 of the present embodiment, with respect to the entire adhesive layer 101 that bonds the respective honeycomb fired bodies to one another, the pore diameters of the pores in the cross-section observation photograph of the adhesive layer 101 are about 300 μm or less, and the ratio of the total area occupied by pores having a pore diameter of at least about 50 μm and at most about 300 μm and an aspect ratio of at least about 1 and at most about 1.5 relative to the total area occupied by pores having a pore diameter of at least about 50 μm and at most about 300 μm is about 90% or more.

Figure 3A:
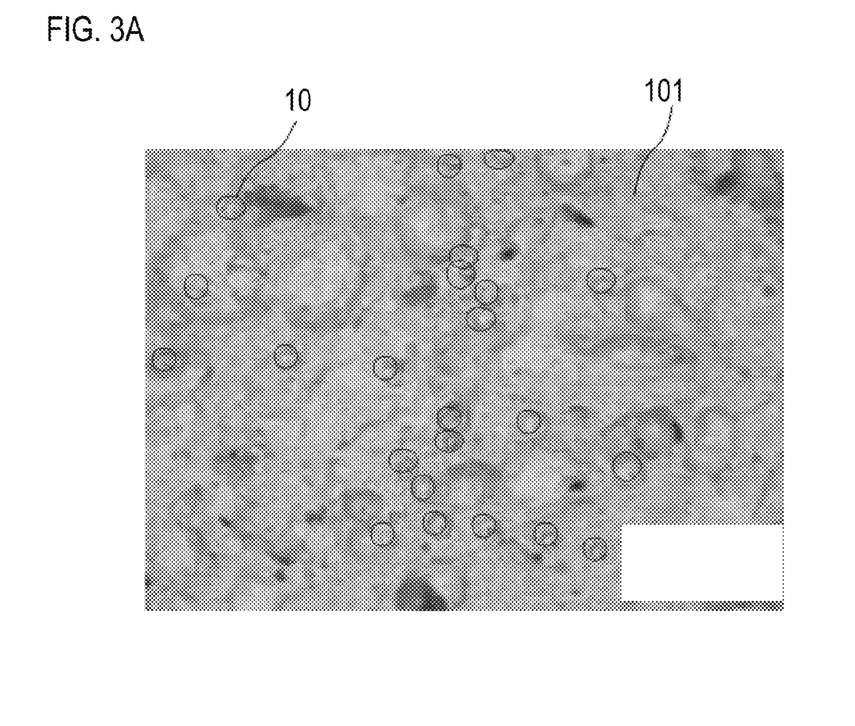
FIG. 3A shows one example of a photograph for observation of a cross-section of an adhesive layer of the honeycomb structure according to one embodiment of the present invention using a microscope at magnification of ×150.

FIG. 3A shows one example of a photograph for observation of a cross-section of an adhesive layer of the honeycomb structure according to one embodiment of the present invention using a microscope at magnification ×150.

Figure 3B:
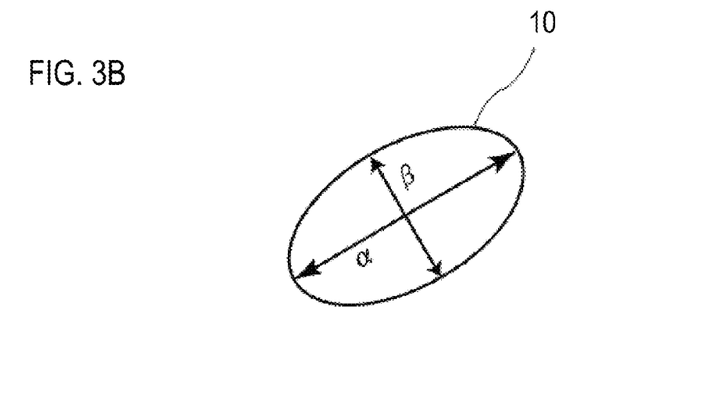
FIG. 3B is a schematic view that shows a shape of a pore shown in FIG. 3A.

Moreover, FIG. 3B is a schematic view that shows a shape of a pore shown in FIG. 3A.

In the cross-section of an adhesive layer 101 shown in FIG. 3A, surrounded portions by a circle correspond to pore 10. The pore diameter of each pore 10 is defined as its major axis (the length represented by an arrow α in FIG. 3B).

The length of the miner axis (the length represented by an arrow β in FIG. 3B) as well as the length of the major axis was measured on each pore, and the aspect ratio of each pore is calculated as a ratio of the length of the major axis and the minor axis.

Moreover, the total areas occupied by pores and the ratio are calculated as follows:

(1) selecting pores having a diameter of at least about 50 μm and at most about 300 μm out of pores in one photograph, and determining the sum of the areas of the selected pores (total area A);

(2) calculating the aspect ratio of each selected pore, and classifying the pores into pores having an aspect ratio of at least about 1 and at most about 1.5 and pores having an aspect ratio of more than about 1.5;

(3) determining the sum of the areas of the pores having an aspect ratio of at least about 1 and at most about 1.5 (total area B): and (4) determining the ratio C (%) of the total area B relative to the total area A.

In the honeycomb structure of the present embodiment, the ratio C determined by following the above-mentioned procedure (1) to (4) is about 90% or more.

In general, it is presumed that pores having a large aspect ratio are usually formed by a plurality of pores coupled with one another. Moreover, it is presumed that pores tend to be easily coupled with each other when the pores are concentrated in a narrow area in one portion of the adhesive layer, that is, distances between the pores are short.

Therefore, the presence of pores having a high aspect ratio in the adhesive layer indicates concentrated presence of a plurality of pores in a narrow area prior to coupling of pores.

In the honeycomb structure of the present embodiment, pores having a pore diameter of pores of at least about 50 μm and at most about 300 μm and a high aspect ratio are rarely present in the adhesive layer. This indicates that pores having a pore diameter of at least about 50 μm and at most about 300 μm are virtually uniformly distributed in the adhesive layer, that is, the pores are not present in such a narrow area as to cause the coupled pores.

Here, in the honeycomb structure of the present embodiment, the aspect ratios of pores having a pore diameter of less than about 50 μm are not particularly limited. This is presumably because even when the aspect ratio of a pore having a pore diameter of less than about 50 μm is high, the pore has only little possibility of causing damage originating therefrom.

The following description will discuss a method for manufacturing a honeycomb structure of the present embodiment.

First, a combining process for bonding a plurality of honeycomb fired bodies to one another with an adhesive layer interposed therebetween will be described, and next all processes for manufacturing a honeycomb structure will be described.

Although not particularly limited, the method for manufacturing a honeycomb aggregated body by bonding honeycomb fired bodies to one another is preferably carried out as follows: forming an adhesive paste layer between the honeycomb fired bodies; and forming a honeycomb aggregated body by drying and solidifying the adhesive paste layer.

For example, the following method is proposed.

First, an adhesive paste is prepared.

The main components of the adhesive paste preferably include a combination of inorganic fibers and an inorganic binder, a combination of inorganic particles and an inorganic binder, or a combination of inorganic fibers, inorganic particles and an inorganic binder.

With respect to the ratios of the respective components, when the inorganic fibers and the inorganic binder, or the inorganic particles and the inorganic binder are contained as main components, the content of the inorganic fibers or the inorganic particles is preferably at least about 70% by weight and at most about 95% by weight relative to at least about 5% by weight and at most about 30% by weight of the inorganic binder as a solids content, and when the inorganic fibers, the inorganic particles and the inorganic binder are contained as main components, the content of the inorganic particles is preferably at least about 35% by weight and at most about 65% by weight and the content of the inorganic fibers is preferably at least about 30% by weight and at most about 60% by weight relative to at least about 5% by weight and at most about 30% by weight of the inorganic binder as a solids content.

Further, the adhesive paste preferably contains a foaming material.

Examples of the foaming material include two kinds: a material that expands due to heat; and a material that generates a gas by a chemical reaction. Out of these, the material that expands due to heat includes a microcapsule, a foaming resin and the like. On the other hand, the material that generates a gas by a chemical reaction includes an inorganic foaming agent, an expansive agent and the like.

Moreover, the adhesive paste may contain an organic binder. However, upon use of the honeycomb structure as an exhaust gas filter for vehicles, the temperature thereof rises so high that the organic binder is easily decomposed and disappears, leading to fluctuation of the adhesive strength. Therefore, the organic binder is desirably contained in as small an amount as possible.

Successively, an adhesive paste layer is formed on each of the side faces of the honeycomb fired bodies by using the adhesive paste.

Figure 4:
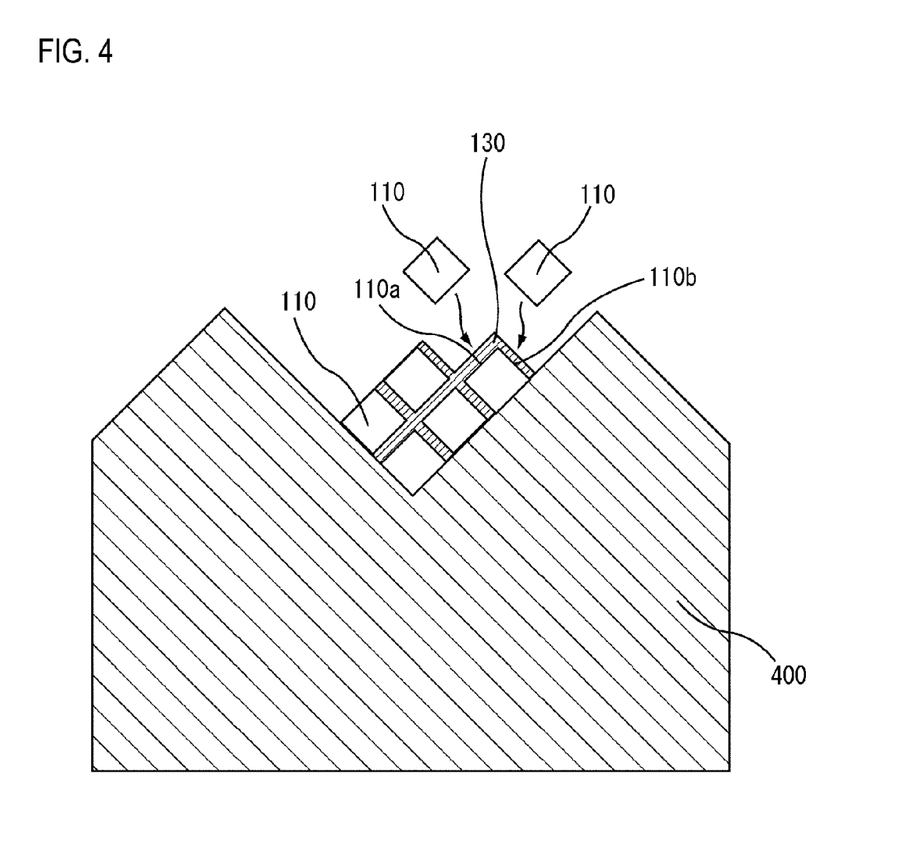
FIG. 4 is a cross-sectional view that schematically shows one example of a method for forming an adhesive paste layer on each side face of the honeycomb fired bodies.

FIG. 4 is a cross-sectional view that schematically shows one example of a method for forming the adhesive paste layer on each side face of the honeycomb fired bodies.

The method for forming the adhesive paste layer is not particularly limited. For example, an adhesive paste layer 130 having a predetermined thickness is formed as follows: placing a honeycomb fired body 110 on a base having a V-shaped cut surface along the V-shape of the base; and applying the adhesive paste to two side faces (110a and 110b) facing upward of the honeycomb fired body 110 by using a squeeze or the like.

Next, an other honeycomb fired body 110 is placed on the adhesive paste layer 130. Then, the adhesive paste is further applied to the side face facing upward of the other honeycomb fired body 110, so that an adhesive paste layer 130 is formed. Then, by repeatedly laminating another honeycomb fired body on this adhesive paste layer, a honeycomb aggregated body 150 including a predetermined number of honeycomb fired bodies with the adhesive paste layer interposed therebetween was manufactured.

Successively, the honeycomb aggregated body was heated and pressurized so that the adhesive paste is solidified to form adhesive layers.

Figure 5A:
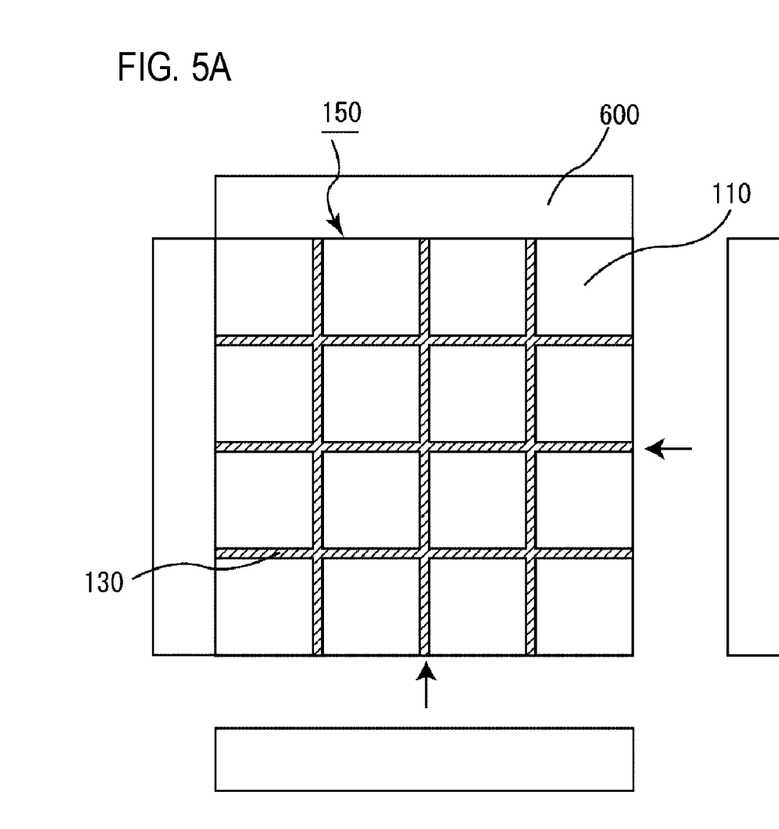
FIGS. 5A and 5B are cross-sectional views that schematically show one example of a method for forming adhesive layers by heating and pressurizing.
Figure 5B:
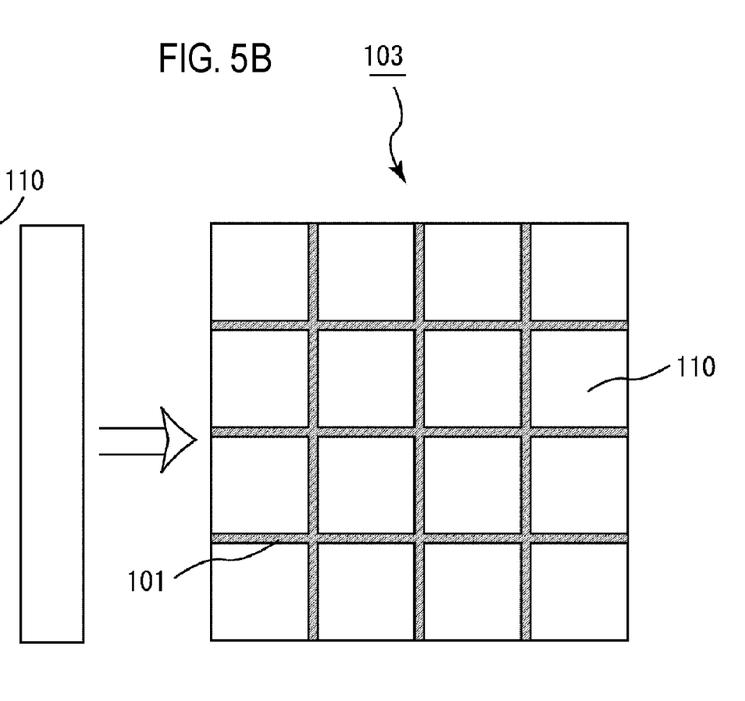

FIGS. 5A and 5B are cross-sectional views that schematically show one example of a method for forming the adhesive layer by heating and pressurizing.

In this process, as shown in FIG. 5A, the periphery of the honeycomb aggregated body 150 is sandwiched by pressurizing and heating plates 600. By using the pressurizing and heating plates 600, each of the side faces of the honeycomb aggregated body 150 is heated and pressurized. A direction to be heated is indicated by a black arrow in FIG. 5.

The pressurizing and heating plates are not particularly limited, and any plates may be used, as long as they can carry out heating and pressurizing simultaneously; for example, a device in which SUS plates and temperature-adjustable heaters are combined, a hot pressing device or the like may be desirably used.

Moreover, the heating and pressurizing process may be simultaneously carried out in vertical directions and horizontal directions, or may be successively carried out in vertical directions and horizontal directions separately.

Here, the heating and pressurizing are preferably carried out under the following condition. The heating temperature is preferably at least about 150° C. and at most about 500° C., and more preferably in the range of about 200° C. to about 400° C. The applied pressure is preferably at least about 0.005 MPa and at most about 0.05 MPa, and more preferably in the range of about 0.01 MPa to about 0.04 MPa. The heating and pressurizing time is preferably at least about 5 minutes and at most about 60 minutes, and more preferably in the range of about 10 minutes to about 30 minutes.

By drying and solidifying the adhesive paste using such a method, the adhesive layer 101 is formed as shown in FIG. 5B to manufacture a ceramic block 103 having a plurality of honeycomb fired bodies 110 that are combined with one another with the adhesive layer 101 interposed therebetween.

As described above, a uniform distribution of pores in the adhesive layer to be formed may be more easily achieved by using an adhesive paste containing a foaming material, and by simultaneously drying and pressurizing the honeycomb aggregated body to heat and pressurize the adhesive paste while making the foaming material foam. Moreover, it may be easier to avoid formation of pores having a large pore diameter and a high aspect ratio in the adhesive layer.

The following description will discuss all manufacturing processes for manufacturing the honeycomb structure.

A molding process is carried out to manufacture a honeycomb molded body by extrusion-molding a raw material composition containing ceramic powders and a binder.

First, as a ceramic raw material, silicon carbide powders having different average particle diameters, an organic binder, a plasticizer in liquid form, a lubricant and water are mixed by using a wet mixer to prepare a wet mixture for manufacturing a honeycomb molded body.

Successively, the wet mixture is loaded into an extrusion molding machine.

When the wet mixture is loaded into the extrusion molding machine, the wet mixture is extrusion-molded into a honeycomb molded body having a predetermined shape.

Next, the honeycomb molded body is cut into a predetermined length, and dried by using a drying apparatus, such as a microwave drying apparatus, a hot-air drying apparatus, a dielectric drying apparatus, a reduced-pressure drying apparatus, a vacuum drying apparatus and a freeze drying apparatus, and a sealing process is carried out by filling predetermined cells with a plug material paste to be a plug for sealing the cells.

Here, conditions conventionally used upon manufacturing a honeycomb fired body are applicable for carrying out the cutting process, the drying process and the sealing process.

Next, a degreasing process is carried out to obtain a honeycomb degreased body by removing the organic components in the honeycomb molded body by heating the honeycomb molded body in a degreasing furnace. Then, the honeycomb degreased body is transported to a firing furnace, and a firing process is carried out to manufacture a honeycomb fired body.

Through the above-mentioned processes, the honeycomb fired body is manufactured.

Here, conditions conventionally used upon manufacturing a honeycomb fired body are applicable for carrying out the degreasing process and the firing process.

Thereafter, the combining process described above is carried out to form a ceramic block. Further, a periphery cutting process is carried out to form the ceramic block into a round pillar-shaped by cutting the side faces of the ceramic block using a diamond cutter or the like.

Moreover, a coating process is carried out to form a coat layer on the periphery of the ceramic block formed into a round pillar-shaped by applying a sealing material paste to the periphery of the ceramic block, then drying and solidifying the sealing material paste.

Here, the sealing material paste may preferably contain the same materials as those of the adhesive paste. Alternatively, the sealing material paste may contain a different material from those of the adhesive paste.

The sealing material paste may also contain a foaming material.

Through the above-mentioned processes, a round pillar-shaped honeycomb structure can be manufactured in which a coat layer is formed on the periphery of a ceramic block including a plurality of honeycomb fired bodies bonded to one another with an adhesive layer interposed therebetween.

Here, the coat layer does not necessarily need to be formed, and may be formed on demand.

The following description will summarize effects of the honeycomb structure of the present embodiment.

(1) In the honeycomb structure of the present embodiment, the pore diameters of pores in a cross-section observation photograph of an adhesive layer are about 300 μm or less, and no large voids to cause damage originating therefrom are present. As a result, it may be easier to prevent a crack originating from a large void from occurring in the adhesive layer.

(2) Moreover, about 90% or more of pores having a pore diameter of at least about 50 μm and at most about 300 μm have an aspect ratio of at least about 1 and at most about 1.5. A honeycomb structure having such an adhesive layer formed has few portions to cause damage originating therefrom upon application of a thermal shock, and therefore, cracks tend not to occur in the adhesive layer.

(3) Furthermore, since the Young's modulus of the adhesive layer tends to be low, it may be easier to effectively alleviate a thermal shock applied to the honeycomb structure.

EXAMPLES

Example 1

The following description will discuss Examples that specifically disclose the first embodiment of the present invention. Here, the present invention is not intended to be limited only by these Examples.

(Manufacturing Process of Honeycomb Fired Body)

An amount of 52.8% by weight of a silicon carbide coarse powder having an average particle diameter of 22 μm and 22.6% by weight of a silicon carbide fine powder having an average particle diameter of 0.5 μm were dry-mixed. To the resulting mixture, 2.1% by weight of an acrylic resin, 4.6% by weight of an organic binder (methylcellulose), 2.8% by weight of a lubricant (UNILUB, manufactured by NOF Corporation), 1.3% by weight of glycerin, and 13.8% by weight of water were added, and then kneaded to prepare a mixed composition (wet mixture). The obtained mixed composition was extrusion-molded, so that a raw honeycomb molded body having virtually the same shape as the shape shown in FIG. 2A and having cells not sealed was manufactured.

Next, the raw honeycomb molded body was dried by using a microwave drying apparatus to obtain a dried honeycomb molded body. Then, using a paste having the same composition as that of the raw molded body, predetermined cells were filled, and the dried honeycomb molded body thus filled was again dried by using a drying apparatus.

The dried honeycomb molded body was degreased at 400° C., and then fired at 2200° C. under normal pressure argon atmosphere for three hours, so that a honeycomb fired body including a silicon carbide sintered body, with a porosity of 45%, an average pore diameter of 15 μm, a size of 34.3 mm×34.3 mm×150 mm, the number of cells (cell density) of 300 pcs/inch2 and a thickness of the cell wall of 0.25 mm (10 mil), was manufactured.

(Preparation of Adhesive Paste Containing a Foaming Material)

An amount of 36% by weight of alumina fibers having an average fiber length of 20 μm, 30.1% by weight of silicon carbide particles having an average particle diameter of 0.6 μm, 16.7% by weight of silica sol, 0.4% by weight of carboxymethyl cellulose, 1.9% by weight of polyvinyl alcohol, 0.6% by weight of lactic acid, 1.5% by weight of a foaming material and 12.9% by weight of water were mixed and kneaded so that an adhesive paste was prepared.

As the foaming material, organic material (acrylonitrile) capsules prepared by sealing isobutane gas therein (Matsumoto Microsphere F, F-50 (particulate diameter of 10 to 20 μm), manufactured by Matsumoto Yushi-Seiyaku Co., Ltd.) was used.

(Combining Process)

A honeycomb fired body was placed on a base having a V-shaped cut surface as shown in FIG. 4 along the V-shape of the base. Thereafter, the adhesive paste containing the foaming material was applied by using a squeeze to two side faces facing upward so as to form an adhesive paste layer containing the foaming material. By repeatedly laminating another honeycomb fired body on the adhesive paste layer, a laminated body of honeycomb fired bodies including 16 pieces of honeycomb fired bodies was manufactured.

Next, as shown in FIG. 5A, the periphery of the honeycomb fired bodies having the adhesive paste layer containing the foaming material formed thereon was sandwiched by pressurizing and heating plates having a thickness of 2 cm with SUS plates and heaters. Thereafter, the side faces of the honeycomb aggregated bodies were heated and pressurized so that the adhesive paste was solidified to form an adhesive layer, with formation of small voids (air bubbles) in the adhesive layer by foaming of the foaming material.

Here, the heating temperature (a temperature of the pressurizing and heating plates) was 300° C., the applied pressure was 0.01 MPa, and the heating and pressurizing time was 15 minutes.

Through the combining process, a ceramic block including 16 pieces of honeycomb fired bodies combined with one another was manufactured.

(Periphery Cutting Process and Coat Layer Forming Process)

Next, the periphery of the ceramic block was cut into a round pillar-shape by using a diamond cutter.

Successively, a sealing material paste layer having a thickness of 0.2 mm was formed on the periphery of the ceramic block by using a sealing material paste including the same materials as those of the adhesive paste containing the foaming material. The sealing material paste layer was dried at 120° C. so that a round pillar-shaped honeycomb structure having a size of 200.0 mm in diameter×150 mm in length with a sealing material layer formed on the periphery thereof was manufactured.

Example 2

An adhesive paste containing a foaming material was prepared by following the same procedure as in Example 1, except that a material prepared by sealing an isobutane gas in a capsule made from an organic material (acrylonitrile) (Matsumoto Microsphere F F-80S (particle size: 20 to 30 μm), manufactured by Matsumoto Yushi-Seiyaku Co., Ltd.) was used as the foaming material, the blending ratio of the foaming material was 2.0% by weight and the blending ratio of water was 12.4%.

A honeycomb structure was manufactured by following the same procedure as in Example 1 except the above-mentioned procedure.

Comparative Examples 1 and 2

In the combining process, an adhesive layer was formed by solidifying the adhesive paste by heating a honeycomb aggregated body at 120° C. using a drying apparatus, without pressurizing.

Honeycomb structured bodies of Comparative Examples 1 and 2 were manufactured by following the same procedure as in Example 1 or 2 except the above-mentioned procedure.

Comparative Example 3

The same adhesive paste as that used in Example 1 except that no foaming material is contained, was used. In the combining process, an adhesive layer was formed by solidifying the adhesive paste by heating a honeycomb aggregated body at 120° C. using a drying apparatus, without pressurizing.

A honeycomb structure was manufactured by following the same procedure as in Example 1 except the above-mentioned procedure.

With respect to each of the honeycomb structured bodies manufactured in the respective Examples and Comparative Examples, by using a microscope, the pore diameters of pores present in the adhesive layer within a microscope field (4 mm2) of 2 mm square were measured, and the aspect ratios of pores having a pore diameter of 50 to 300 μm were measured to calculate the ratio of the total area occupied by pores having a pore diameter of 50 to 300 μm and an aspect ratio of 1 to 1.5.

Moreover, each of the honeycomb structured bodies manufactured in the respective Examples and Comparative Examples was observed to find whether or not any cracks occurred upon applying a thermal shock to the honeycomb structure, by the following procedure.

First, each of the manufactured honeycomb structured bodies in all Examples, and Comparative Example was placed in an exhaust passage of an engine, and a commercially available catalyst supporting honeycomb structure made of cordierite (diameter: 200 mm, length: 100 mm, cell density: 400 pcs/inch2, amount of supported platinum: 5 g/L) was placed in the exhaust passage of an engine at a position closer to a gas-inlet side than the honeycomb structure as an exhaust gas purifying apparatus. Particulates were captured for 7 hours, while the engine was driven at the number of revolutions of 3000 min-1 and a torque of 50 Nm. The amount of the captured particulates was 8 g/L.

Next, the engine was driven at the number of revolutions of 1250 min-1 and a torque of 60 Nm, and when the temperature of the filter became constant, the state was kept for one minute. Thereafter, a post injection was performed, and then the temperature of exhaust gases was raised by utilizing the oxidation catalyst present at the front side of the exhaust gas purifying apparatus to burn particulates.

The conditions for the post injection were set so that the temperature of the center portion of the honeycomb structures was raised and became almost constant at 600° C. within one minute from the initiation. Then, the above-mentioned processes were repeated 10 times, and observations were performed visually and using a magnifying microscope (magnification: 5 times) to determine whether or not any cracks had occurred in the adhesive layer bonding the honeycomb fired bodies to each other.

Table 1 collectively shows "the number of pores having a pore diameter of 50 to 300 μm in the microscope photograph", "the ratio of the total area occupied by pores having a pore diameter of 50 to 300 μm and an aspect ratio of 1 to 1.5" and "the presence or absence of cracks".

TABLE 1

| | Number of pores having a pore diameter of 50 to 300 μm | Number of pores having an aspect ratio of 1 to 1.5 (%) | Presence or absence of cracks |
| --- | --- | --- | --- |
| Example 1 | 30 | 90 | Absence |
| Example 2 | 10 | 90 | Absence |
| Comparative Example 1 | 30 | 85 | Presence |
| Comparative Example 2 | 10 | 85 | Presence |
| Comparative Example 3 | 0* | 0 | Presence |

*Large voids occurred in Comparative Example 3.

As shown in Examples 1 and 2, in the honeycomb structured bodies in which pores having a pore diameter of at least about 50 μm and at most about 300 μm were present in the adhesive layer and the ratio of the total area occupied by pores having a pore diameter of at least about 50 μm and at most about 300 μm and an aspect ratio of at least about 1 and at most about 1.5 was about 90% or more, no cracks occurred in the adhesive layer even upon application of a thermal shock to the honeycomb structure.

In contrast, as shown in Comparative Examples 1 and 2, in the honeycomb structured bodies in which the ratio of the total area occupied by pores having a pore diameter of at least about 50 μm and at most about 300 μm and an aspect ratio of at least about 1 and at most about 1.5 was less than about 90%, cracks occurred in the adhesive layer upon application of a thermal shock to the honeycomb structure.

Presumably, these cracks occurred originating from a pore having a high aspect ratio.

Figure 6A:
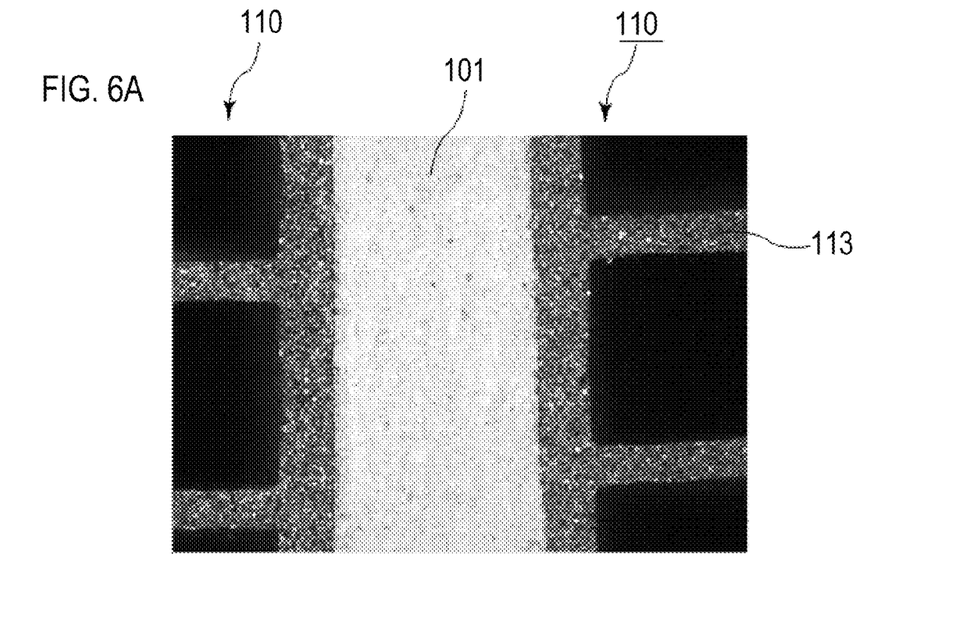
FIG. 6A is a cross-sectional photograph that shows one portion of a cross-section of an adhesive layer of a honeycomb structure manufactured in Example 1.
Figure 6B:
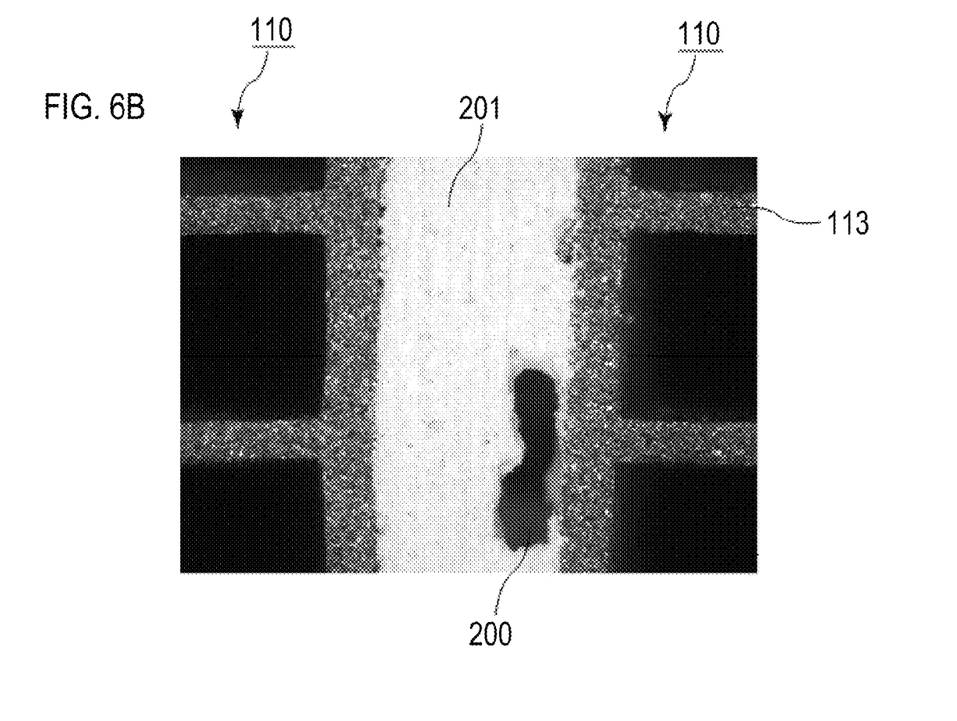
FIG. 6B is a cross-sectional photograph that shows one portion of a cross-section of an adhesive layer of a honeycomb structure manufactured in Comparative Example 3.

FIG. 6A is a cross-sectional photograph that shows one portion of a cross-section of the adhesive layer of the honeycomb structure manufactured in Example 1, and FIG. 6B is a cross-sectional photograph that shows one portion of a cross-section of the adhesive layer of the honeycomb structure manufactured in Comparative Example 3.

As shown in FIG. 6A, in the honeycomb structure manufactured in Example 1, a gap between the honeycomb fired bodies was filled with the adhesive layer 101 without any voids.

In contrast, as shown in FIG. 6B, the honeycomb structure manufactured in Comparative Example 3 had a large void 200 in the adhesive layer 201.

Moreover, in the honeycomb structure manufactured in Comparative Example 3, cracks occurred in the adhesive layer upon application of a thermal shock. Presumably, these cracks occurred originating from a large void.

Other Embodiments

In the honeycomb structure according to the embodiments of the present invention, an end portion of each cell may not be sealed. Such a honeycomb structure may be desirably used as a catalyst supporting carrier.

Although not particularly limited, the shape of the honeycomb fired bodies is preferably designed so as to easily combine the honeycomb fired bodies with one another upon forming a honeycomb structure, and examples of its cross-sectional shape include a square, rectangular, hexagonal, sector shape or the like.

The shape of the honeycomb structure according to the embodiments of the present invention is not particularly limited to a round pillar-shape, and may be a desired pillar shape such as a cylindroid shape and a polygonal pillar shape.

An inorganic binder, inorganic fibers and inorganic particles, and a foaming material contained in the adhesive paste are not particularly limited, and examples of the inorganic binder contained in the adhesive paste include silica sol, alumina sol, and the like. These may be used alone, or in a combination of two or more. Out of the inorganic binders, silica sol is more preferably used.

Examples of the inorganic fibers contained in the adhesive paste include ceramic fibers, such as silica-alumina, mullite, alumina and silica. Each of these may be used alone or two or more kinds of these may be used in combination. Out of the inorganic fibers, alumina fibers are more preferably used.

Examples of the inorganic particles contained in the adhesive paste include carbides, nitrides, and the like, more specifically, inorganic powder including silicon carbide, silicon nitride, boron nitride or the like. Each of these may be used alone, or two or more kinds of these may be used in combination. Out of the inorganic particles, silicon carbide, which is superior in thermal conductivity, is more preferably used.

Examples of microcapsules out of the foaming materials contained in the adhesive pastes include thermally expandable particles obtained by forming a shell wall made from a copolymer material such as vinylidene chloride, acrylonitrile, melamine, and phenol by an in-site polymerizing method or the like, and capsulating a low-boiling point material (hydrocarbons such as butane and pentane) or a gas (carbon dioxide gas or the like).

Here, examples of the foaming resin include acrylonitrile, polypropylene, polystyrene, polyethylene terephthalate, polycarbonate and the like.

Examples of the inorganic foaming material include pearlite particles, shirasu balloons and the like.

Moreover, examples of the expansive agent include ammonium chloride, ammonium hydrogencarbonate, sodium hydrogencarbonate, ammonium carbonate, amyl acetate, butyl acetate, ammonium aluminum sulfate, potassium aluminum sulfate, potassium hydrogentartrate, diazodiamino benzene and the like.

Out of these foaming materials, microcapsules and foaming resins are desirable.

Use of the microcapsules or the foaming resin allows the resin component to disappear by drying, firing, burning or the like. In contrast, the foaming material (for example, the above-mentioned expansive agent) that depends on a chemical reaction occasionally causes the curing reaction when added, and may fail to function as a foaming material. The inorganic foaming material may cause remaining inorganic component in voids even after the firing.

Any of these foaming materials is desirably added in amount of at least about 0.5% by weight and at most about 10% by weight to the adhesive paste relative to its entire weight.

The amount of about 0.5% by weight or more tends to sufficiently exert the effects of the foaming material, and is less likely to form large voids (air bubbles). As a result, the adhesive strength tends not to be degraded. In contrast, the amount of about 10% by weight or less tends not to cause too many voids (air bubbles), and is less likely to degrade the adhesive strength.

The porosity of the honeycomb fired body is not particularly limited, and desirably at least about 35% and at most about 60%.

When the honeycomb structure is used as a filter, the porosity of about 35% or more is less likely to cause clogging in the honeycomb structure. In contrast, the porosity of about 60% or less tends not to cause a reduction in the strength of the honeycomb fired body, and the honeycomb fired body tends not to be easily broken.

The average pore diameter of the honeycomb fired body is desirably at least about 5 μm and at most about 30 μm.

When the honeycomb structure is used as a filter, the average pore diameter of about 5 μm or more is less likely to cause clogging due to particulates. In contrast, when the average pore diameter is about 30 μm or less, particulates tend not to pass through the pores. As a result, the honeycomb fired body tend to surely function as a filter.

Here, the porosity and the average pore diameter can be measured through conventionally known methods such as a mercury porosimetry, Archimedes method, and a measuring method using a scanning electronic microscope (SEM).

The cell density in the cross-section perpendicular to the longitudinal direction of the honeycomb fired body is not particularly limited. However, a desirable lower limit thereof is about 31.0 pcs/cm2 (about 200 pcs/in2) and a desirable upper limit is about 93 pcs/cm2 (about 600 pcs/in2). A more desirable lower limit is about 38.8 pcs/cm2 (about 250 pcs/in2) and a more desirable upper limit is about 77.5 pcs/cm2 (about 500 pcs/in2).

Further, the thickness of the cell walls of the honeycomb fired body is not particularly limited, and desirably at least about 0.1 mm and at most about 0.4 mm.

The main component of constituent materials of the honeycomb fired body is not limited to silicon carbide. Examples of other ceramic materials may include ceramic powders, for example, nitride ceramics such as aluminum nitride, silicon nitride, boron nitride and titanium nitride; carbide ceramics such as zirconium carbide, titanium carbide, tantalum carbide and tungsten carbide; oxide ceramics such as alumina, zirconia, cordierite, mullite, and aluminum titanate; and the like.

Out of these components, non-oxide ceramics are preferable, and silicon carbide is more preferable because this is excellent in thermal resistance properties, mechanical strength, thermal conductivity and the like. Moreover, examples of the constituent material of the honeycomb structure also include silicon-containing ceramics, in which metallic silicon is blended with the above-described ceramics, as well as a ceramic material such as ceramic bound by silicon or silicate compounds. And out of these, those ceramics (silicon-containing silicon carbide) in which metallic silicon is blended with silicon carbide are desirably used.

Especially, a silicon-containing silicon carbide ceramic containing about 60% by weight or more of silicon carbide is desirable.

The particle diameter of the ceramic powder is not particularly limited, and the ceramic powder that tends not to cause the case where the size of the honeycomb fired body manufactured by the following firing treatment becomes smaller than that of the honeycomb molded body after degreased is preferable.

The organic binder in the wet mixture is not particularly limited, and examples thereof include methylcellulose, carboxy methylcellulose, hydroxy ethylcellulose, polyethylene glycol, and the like. Methylcellulose is desirable out of these. A blending amount of the organic binder is desirably at least about 1 part by weight and at most about 10 parts by weight with respect to 100 parts by weight of ceramic powder.

The plasticizer in the wet mixture is not particularly limited, and examples thereof include glycerin and the like. The lubricant is not particularly limited, and examples thereof include polyoxyalkylene-based compounds such as polyoxyethylene alkyl ether and polyoxypropylene alkyl ether, and the like.

Specific examples of the lubricant include polyoxyethylene monobutyl ether, polyoxypropylene monobutyl ether, and the like.

Moreover, the plasticizer and the lubricant may not be contained in the mixed raw material powders in some cases.

In addition, a dispersant solution may be used upon preparing a wet mixture, and examples of the dispersant solution include water, an organic solvent such as benzene, alcohol such as methanol, and the like.

Furthermore, a molding auxiliary may be added to the wet mixture.

The molding auxiliary is not particularly limited, and examples thereof include ethylene glycol, dextrin, fatty acid, fatty acid soap, polyalcohol and the like.

Furthermore, a pore-forming agent such as balloons that are fine hollow spheres including oxide-based ceramics, spherical acrylic particles, graphite and the like may be added to the wet mixture, if necessary.

The balloon is not particularly limited, and examples thereof include alumina balloon, glass micro balloon, shirasu balloon, fly ash balloon (FA balloon), mullite balloon and the like. Alumina balloon is desirable out of these.

The plug material paste for sealing the cells is not particularly limited, a plug to be manufactured through the subsequent processes desirably has a porosity of at least about 30% and at most about 75%, and for example, it is possible to use a plug material paste having the same composition as that of the wet mixture of the raw material.

The catalyst to convert or purify exhaust gases may be supported on the honeycomb structure, and desirable examples of the catalyst to be supported include noble metals such as platinum, palladium and rhodium. Out of these, platinum is more desirable. Moreover, an alkali metal such as potassium and sodium, and an alkali earth metal such as barium may be used as other catalysts. These catalysts may be used alone, or two or more kinds of these may be used in combination.

As the method for manufacturing the honeycomb structure according to the embodiments of the present invention, for example, a method may be used in which a plurality of honeycomb aggregated bodies are manufactured, and an adhesive paste layer (adhesive paste layer containing a foaming material) is formed on each of the side faces of the honeycomb aggregated bodies so that a plurality of honeycomb aggregated bodies are combined with one another in a combining process.

Examples of the method for forming the adhesive paste layer are not particularly limited and may include a method in which each of the honeycomb fired bodies is temporally fixed in a molding frame having the virtually same shape as the shape of the ceramic block to be manufactured and an adhesive paste is injected into the each gap between the honeycomb fired bodies, and the like.

It is obvious that the present invention is not limited to the above-described embodiment, but can be applied to, for example, motorcycles or three-wheeled vehicles without limiting to the saddle-ride type four-wheeled vehicles, and various modifications can be made in a range without departing from the gist of the invention.

What is claimed as new and desired to be secured by Letters Patent of the United States is:

1. A honeycomb structure comprising:
    a plurality of honeycomb fired bodies each having a longitudinal direction and a plurality of cell walls extending along the longitudinal direction to define a plurality of cells; and
    an adhesive layer provided between the plurality of honeycomb fired bodies to connect the plurality of honeycomb fired bodies, pore diameters of pores in the adhesive layer being about 300 μm or less, and, in a cross-section of the adhesive layer perpendicular to the longitudinal direction, a ratio of the total area occupied by pores having a pore diameter of at least about 50 μm and at most about 300 μm and an aspect ratio of at least about 1 and at most about 1.5 relative to the total area occupied by pores having a pore diameter of at least about 50 μm and at most about 300 μm being about 90% or more.

2. The honeycomb structure according to claim 1, wherein a ratio of the total area of pores having a pore diameter of at least about 50 μm and at most about 300 μm to the area of the cross-section is at least about 5% and at most about 30%.

3. The honeycomb structure according to claim 1, wherein said adhesive layer is provided by drying and solidifying an adhesive paste layer.

4. The honeycomb structure according to claim 3, wherein said adhesive paste comprises inorganic fibers and an inorganic binder; inorganic particles and an inorganic binder; or inorganic fibers and inorganic particles and an inorganic binder.

5. The honeycomb structure according to claim 4, wherein said adhesive paste comprises at least about 70% by weight and at most about 95% by weight of said inorganic fibers or said inorganic particles and at least about 5% by weight and at most about 30% by weight of the inorganic binder as a solids content.

6. The honeycomb structure according to claim 4, wherein said adhesive paste comprises at least about 35% by weight and at most about 65% by weight of said inorganic particles and at least about 30% by weight and at most about 60% by weight of said inorganic fibers, relative to about 5 to about 30% by weight of the inorganic binder as a solids content.

7. The honeycomb structure according to claim 1, wherein an end portion of each of said cells is sealed.

8. The honeycomb structure according to claim 1, wherein an end portion of each of said cells is not sealed.

9. The honeycomb structure according to claim 1, wherein a catalyst is provided on said honeycomb structure.

* * * * *